US009350893B2

(12) United States Patent
Kimura (10) Patent No.: US 9,350,893 B2
(45) Date of Patent: May 24, 2016

(54) OVERHEAD IMAGE READING APPARATUS (71) Applicant: PFU Limited, Kahoku-shi, Ishikawa (JP)

(72) Inventor: Keisuke Kimura, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 13/914,402

(22) Filed: Jun. 10, 2013

(65) Prior Publication Data
US 2013/0335789 A1 Dec. 19, 2013

(30) Foreign Application Priority Data
Jun. 13, 2012 (JP) ................................ 2012-134185

(51) Int. Cl.
*H04N 1/04* (2006.01)
*H04N 1/028* (2006.01)
*H04N 1/10* (2006.01)
*H04N 1/193* (2006.01)
*H04N 1/40* (2006.01)

(52) U.S. Cl.
CPC ....... *H04N 1/02815* (2013.01); *H04N 1/02895* (2013.01); *H04N 1/10* (2013.01); *H04N 1/193* (2013.01); *H04N 1/40056* (2013.01); *H04N 2201/0436* (2013.01)

(58) Field of Classification Search
CPC .............. H04N 1/02815; H04N 1/193; H04N 1/40056; H04N 2201/02868; H04N 1/1013; H04N 1/484; H04N 1/12; H04N 1/1017; H04N 1/1016; H04N 2201/0425
See application file for complete search history.

(56) References Cited

U.S. PATENT DOCUMENTS

| | | | | |
|---|---|---|---|---|
| 5,218,463 A * | 6/1993 | Lianza et al. | ................. | 358/487 |
| 5,331,176 A * | 7/1994 | Sant' Anselmo et al. | ..... | 250/566 |
| 5,886,342 A * | 3/1999 | Matsui | ........................ | 250/208.1 |
| 6,198,547 B1 * | 3/2001 | Matsuda | ........................ | 358/474 |
| 6,429,422 B1 * | 8/2002 | Bohn | ............................ | 250/234 |
| 6,771,394 B1 | 8/2004 | Nakanishi et al. | | |

(Continued)

FOREIGN PATENT DOCUMENTS

| | | |
|---|---|---|
| JP | 10-145554 A | 5/1998 |
| JP | 11-168600 A | 6/1999 |

(Continued)

OTHER PUBLICATIONS

Notice of Rejection Japanese Patent Application No. 2012-134185 dated Aug. 18, 2015 with English translation.

*Primary Examiner* — Cheukfan Lee
(74) *Attorney, Agent, or Firm* — McDermott Will & Emery LLP (57) ABSTRACT An overhead image reading apparatus includes an image-capturing unit that captures an image of a medium to be read placed on a placement surface from above, a light source capable of irradiating the medium with light, and a brightness controller that gradually alters brightness of the light source at least when the light source is turned on or when the light source is turned off. The overhead image reading apparatus may gradually alter the brightness by duty control on current supplied to the light source. Or, the overhead image reading apparatus may gradually alter the brightness by controlling a current value supplied to the light source. Alternatively, the overhead image reading apparatus may include a variable aperture between the light source and the placement surface to gradually alter the brightness by controlling an opening area of the aperture.

5 Claims, 7 Drawing Sheets

(56) References Cited

U.S. PATENT DOCUMENTS

| | | | |
|---|---|---|---|
| 7,123,292 B1* | 10/2006 | Seeger et al. | 348/218.1 |
| 8,610,966 B2* | 12/2013 | Hatzav et al. | 358/474 |
| 8,736,918 B2* | 5/2014 | Kimura | 358/474 |
| 2002/0126894 A1* | 9/2002 | Segawa et al. | 382/176 |
| 2006/0290625 A1* | 12/2006 | Sugimoto | 345/83 |
| 2007/0284447 A1* | 12/2007 | McQueen | 235/454 |
| 2009/0051712 A1* | 2/2009 | Arai et al. | 345/690 |
| 2009/0237803 A1* | 9/2009 | Hotta et al. | 359/630 |
| 2011/0141314 A1* | 6/2011 | Liu et al. | 348/234 |
| 2011/0267661 A1* | 11/2011 | Hayes et al. | 358/474 |
| 2013/0335786 A1* | 12/2013 | Kimura | 358/474 |
| 2013/0335789 A1* | 12/2013 | Kimura | 358/475 |

FOREIGN PATENT DOCUMENTS

| | | | |
|---|---|---|---|
| JP | 2000307811 A | * | 11/2000 |
| JP | 2001-028671 A | | 1/2001 |
| JP | 2002-116480 A | | 4/2002 |
| JP | 2006-023364 A | | 1/2006 |

* cited by examiner

MAIN-SCANNING DIRECTION

FIG.10

MAIN-SCANNING DIRECTION

OVERHEAD IMAGE READING APPARATUS

CROSS-REFERENCE TO RELATED APPLICATIONS

This application is based upon and claims the benefit of priority from Japanese Patent Application No. 2012-134185, filed Jun. 13, 2012, the entire contents of which are incorporated herein by reference.

BACKGROUND OF THE INVENTION

1. Field of the Invention

The present invention relates to an overhead image reading apparatus.

2. Description of the Related Art

An image reading apparatus including an image-capturing unit that images a medium to be read that is placed from above and a light source that irradiates the medium to be read with light with light has been known in related art. For example, Japanese Patent Application Laid-open No. 2001-28671 discloses a technology of an image reading apparatus including a stand block having a support arm, a scan type illumination means for applying a slit-shaped light beam onto a surface of a manuscript, and a manuscript image scanning means mounted on an upper part of the support arm for scanning a manuscript image illuminated by the slit-shaped light beam and reflected from the surface of the manuscript.

If brightness changes suddenly when the light source for irradiating a medium to be read placed thereon is turned on or off, the user may not be able to adapt himself/herself to the change in brightness and this may result in irritation to the user's eyes.

SUMMARY OF THE INVENTION

It is an object of the present invention to at least partially solve the problems in the conventional technology.

According to an aspect of the present invention, an overhead image reading apparatus comprises an image-capturing unit that captures an image of a medium to be read placed on a placement surface from above; a light source arranged in a manner capable of irradiating the medium to be read with light during capturing the image by the image-capturing unit; and a brightness controller that gradually alters brightness of the light source at least when the light source is turned on or when the light source is turned off.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An overhead image reading apparatus according to embodiments of the present invention will be described in detail below with reference to the drawings. Note that the invention is not limited to these embodiments. Furthermore, components in the embodiments described below include those that can be readily conceived therefrom by a person skilled in the art or that are substantially the same thereto.

First Embodiment

Figure 1:
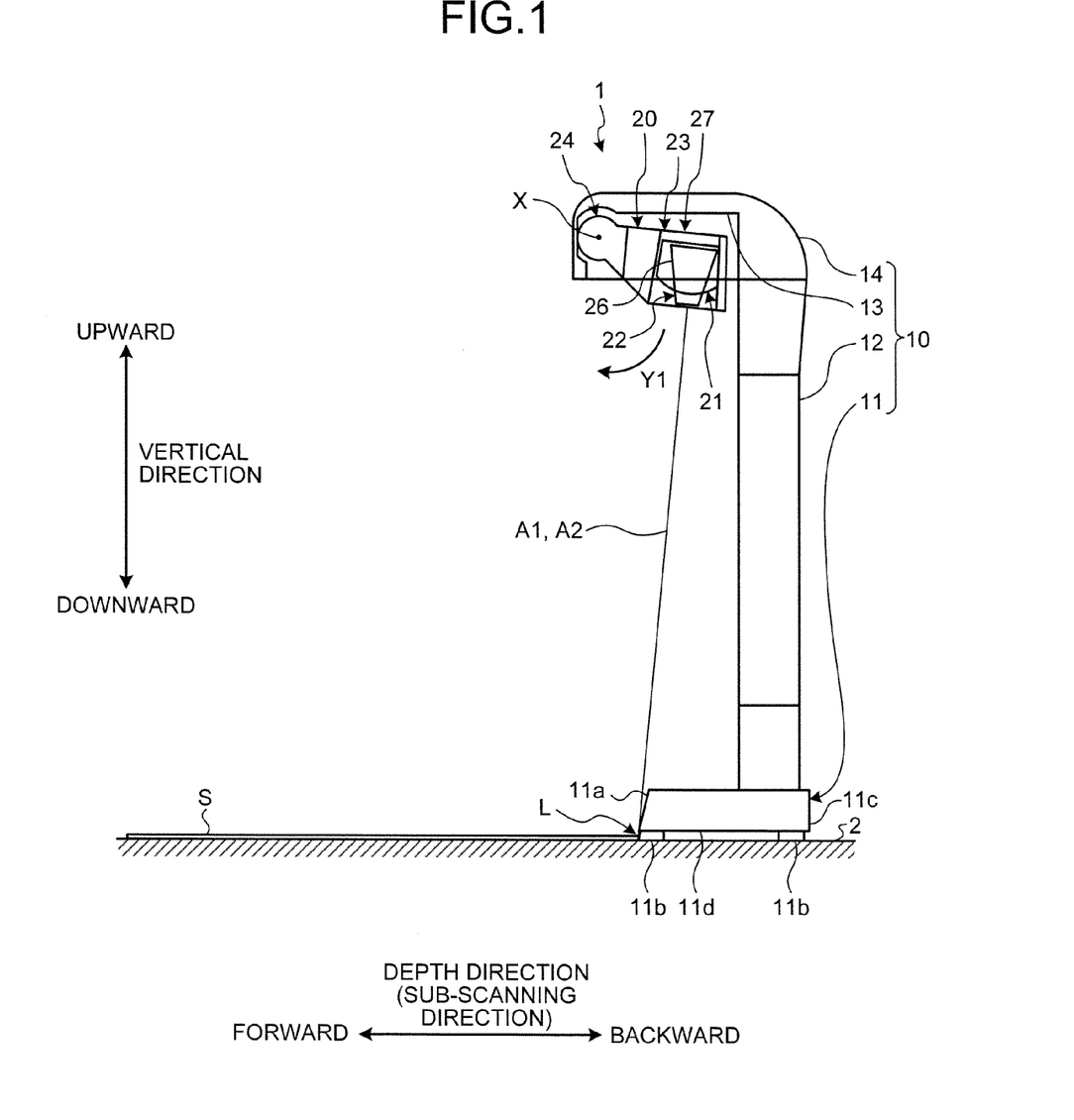
FIG. 1 is a side view illustrating an overhead image reading apparatus according to a first embodiment.
Figure 2:
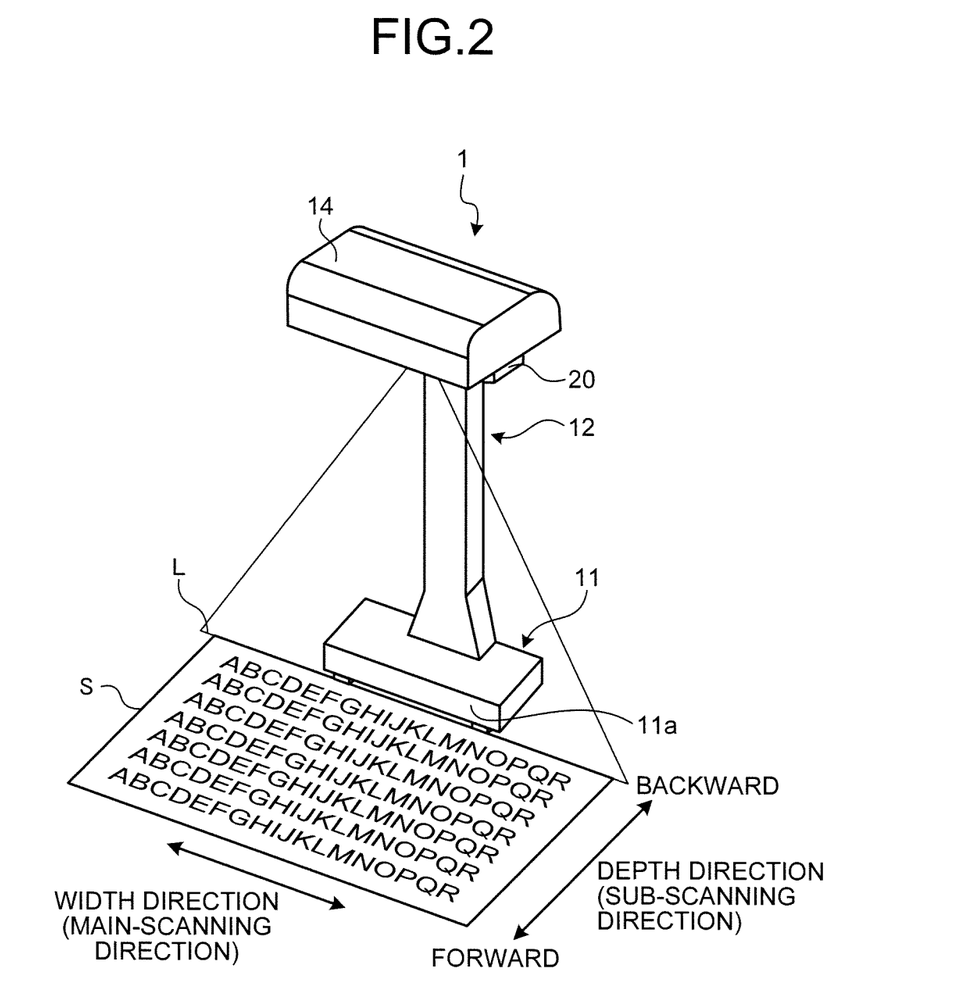
FIG. 2 is a perspective view of the overhead image reading apparatus according to the first embodiment.
Figure 3:
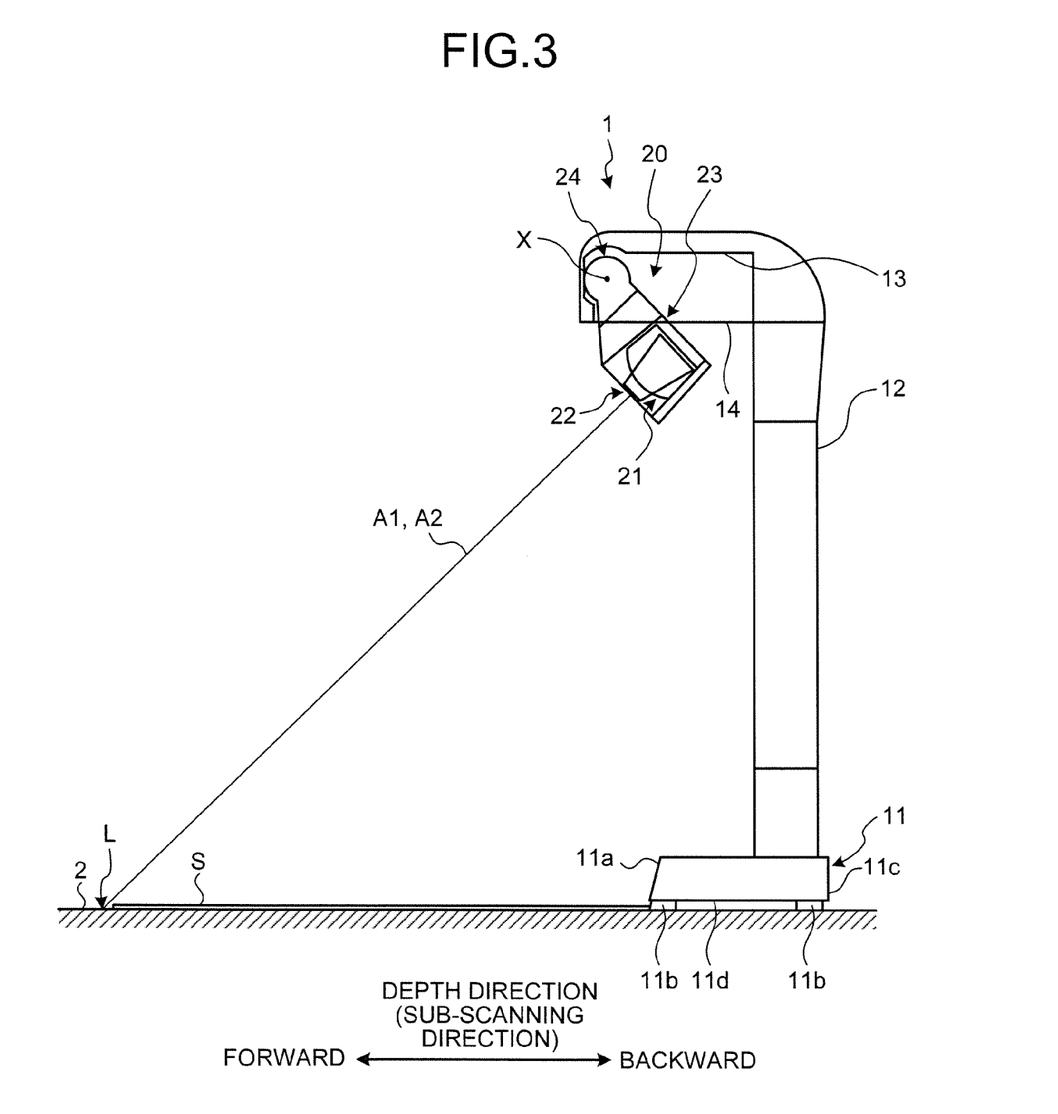
FIG. 3 is a side view illustrating the overhead image reading apparatus at a nearest reading position.
Figure 4:
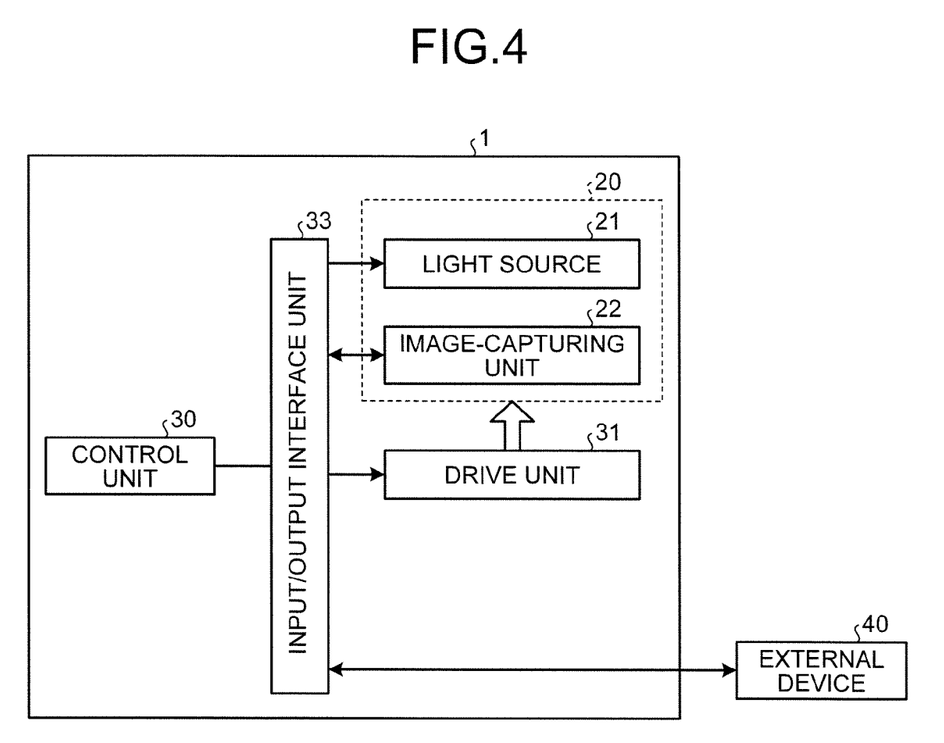
FIG. 4 is a block diagram of the overhead image reading apparatus according to the first embodiment.

A first embodiment will be described with reference to FIGS. 1 to 7. The present embodiment relates to an overhead image reading apparatus. FIG. 1 is a side view illustrating an overhead image reading apparatus 1 according to the first embodiment; FIG. 2 is a perspective view of the overhead image reading apparatus 1 according to the first embodiment; FIG. 3 is a side view illustrating the overhead image reading apparatus 1 at a nearest reading position; and FIG. 4 is a block diagram of the overhead image reading apparatus 1 according to the first embodiment.

The overhead image reading apparatus 1 is an image reading apparatus that reads a medium S to be read, from above in the vertical direction. As illustrated in FIG. 1, the overhead image reading apparatus 1 includes a body 10 and an optical unit 20. The overhead image reading apparatus 1 reads an image on a medium S to be read which is placed on a placement surface 2 located under the optical unit 20 in the vertical direction. The placement surface 2 is, for example, a flat surface such as a top surface of a desk.

The body 10 includes a pedestal 11, an arm 12, a holder 13 and a cover 14. The pedestal 11 is placed on the placement surface 2 or the like and supports the entire body 10, serving as a base of the body 10. Operating switches of the overhead image reading apparatus 1 such as a power switch and a switch for starting image reading are provided on the pedestal 11, for example. The pedestal 11 has a flat shape, for example, and is installed in a manner that a bottom surface 11d thereof and the placement surface 2 face each other. The bottom surface 11d of the pedestal 11 is provided with legs 11b. The legs 11b are positioned at four corners of the bottom surface 11d of the pedestal 11 to support the pedestal 11.

The pedestal 11 in the present embodiment has a shape of a flat rectangular parallelepiped or the like, in which the length in the vertical direction is shorter than both of the length in the width direction (a main-scanning direction, which is described later) and the length in the depth direction (a sub-scanning direction, which is described later). In addition, the length in the width direction of the pedestal 11 is longer than that in the depth direction thereof.

The medium S to be read is placed in a manner that one side of the medium S to be read is butted against a front surface 11a that is one of four side surfaces of the pedestal 11. For example, the medium S to be read is placed in a manner that the medium S to be read is butted against two legs 11b positioned on the side of the front surface 11a. Thus, the medium S to be read is placed on the placement surface 2 so that one side thereof is parallel to the front surface 11a. Herein, with respect to the medium S to be read, when the medium S to be read has a rectangular shape and is placed in a manner that one of the sides thereof is butted against the front surface 11a, the direction parallel to one side of the front surface 11a is defined as the "width direction" or the "main-scanning direction". On the other hand, with respect to the medium S, the direction parallel to a side perpendicular to the side which is butted against the front surface 11a is defined as the "depth direction" or the "sub-scanning direction". In other words, the depth direction is a direction in which the user and the overhead image reading apparatus 1 face each other when the user is opposed to the overhead image reading apparatus 1 with the medium S to be read therebetween, namely, when the user faces the overhead image reading apparatus over the medium S to be read. In the depth direction, the direction from a back surface 11c toward the front surface 11a is referred to as forward direction and the direction from the front surface 11a toward the back surface 11c is referred to as backward direction. Note that the back surface 11c is one of the four side surfaces of the pedestal 11 that is opposed to the front surface 11a in the depth direction.

The arm 12 is connected with the pedestal 11 and extends upward in the vertical direction from the pedestal 11. The arm 12 is connected to a side that is one of four sides constituting the edge of the upper surface of the pedestal 11 and that is opposite to the side on which the medium S to be read is placed. In other words, the arm 12 is connected to an end portion of the pedestal 11 on the side of the back surface 11c that is the farthest surface from the medium S to be read. Furthermore, the arm 12 is connected at the center in the width direction of the pedestal 11.

The holder 13 supports the optical unit 20 rotatably about a rotation axis X. The holder 13 is connected to an upper, in the vertical direction, end portion of the arm 12. The holder 13 sticks out from the arm 12 over the side on which the medium S to be read is placed and from the arm 12 over both sides in the width direction.

The holder 13 sticks out forward in the depth direction longer than the pedestal 11. This means that the front end of the holder 13 is positioned forward of the front end of the pedestal 11. Thus, when the medium S to be read is placed on the placement surface 2 in a manner that the medium S is butted against the pedestal 11, at least a part of the holder 13 faces the medium S in the vertical direction.

The cover 14 covers the holder 13 and the optical unit 20. The cover 14 covers the rotation axis X, the holder 13 and the optical unit 20 from above in the vertical direction, and serves as an outer shell of the upper part of the body including the holder 13 and the optical unit 20. Note that the cover 14 and the holder 13 may be formed integrally. Specifically, the optical unit 20 may be supported by the cover 14 rotatably about the rotation axis X relative to the body 10.

Herein, a term of "radial direction" refers to a radial direction perpendicular to the rotation axis X unless otherwise stated. In addition, "viewed in the axial direction" herein refers to viewed in the axial direction of the rotation axis X unless otherwise stated.

The optical unit 20 is a rotation unit that can rotate about the rotation axis X relative to the body 10. The rotation axis X extends horizontally in the width direction, that is, in the direction parallel to the front surface 11a. The optical unit 20 includes a light source 21, an image-capturing unit 22, a body 23 and a shaft 24. The shaft 24 has a cylindrical shape and is supported rotatably about the rotation axis X by the holder 13 via a bearing or the like. The rotation axis X is positioned forward of the front surface 11a of the pedestal 11. The body 23 of the optical unit 20 is connected to the shaft 24 and extends outward in the radial direction of the rotation axis X from the shaft 24. The body 23 is a hollow member having a rectangular cross-section as viewed in the axial direction, for example. The light source 21 and the image-capturing unit 22 are mounted inside the body 23.

The holder 13 is provided with a drive unit (see a reference numeral 31 in FIG. 4). The drive unit 31 can make the optical unit 20 swing about the rotation axis X by applying a drive force about the rotation axis X to the optical unit 20. The drive unit 31 includes, for example, a drive source such as an electric motor, and a transmission part connecting a rotary shaft of the motor and the optical unit 20. The motor is a stepping motor, for example, and can accurately control a rotation angle of the optical unit 20. The transmission part is made of a combination of pulleys, belts, worm gears and the like, for example, and decelerates the rotation of the motor to transmit the rotation to the optical unit 20.

The light source 21 has a light emitting portion and provided in a manner that the light source 21 can irradiate the medium S to be read with light from above in the vertical direction when the image-capturing unit 22 performs imaging. Here, the term "imaging" means capturing or reading image(s). The light source 21 in the present embodiment has LEDs as the light emitting portion. The light source 21 has a function of irradiating the medium S to be read with a light beam like one emitted through a slit, hereinafter referred to as a slit-light beam, and has a lens capable of emitting the slit-light beam, for example. The optical unit 20 may include a plurality of light sources 21. For example, the light sources 21 may be arranged on both sides of the image-capturing unit 22 in the main-scanning direction.

As illustrated in FIG. 1, the light source 21 and the image-capturing unit 22 are arranged to overlap each other as viewed in the axial direction. More specifically, the optical axis A1 of the light source 21 and the optical axis A2 of the image-capturing unit 22 overlap each other as viewed in the axial direction, that is, the optical axes A1 and A2 are arranged coaxially.

The image-capturing unit 22 is an image sensor having a charge coupled device (CCD) 27, for example. The image-capturing unit 22 can capture an image of the medium S to be read from above, when the medium S to be read is placed on the placement surface 2 below the optical unit 20 in the vertical direction. Specifically, the image-capturing unit 22 converts light reflected by an image to be read, i.e. an image on the medium S to be read, on a reading target line L and entering the image-capturing unit 22 into electronic data by photoelectric conversion, and generates image data of the read image. The image-capturing unit 22 includes a reading lens 26 and the CCD 27. The CCD 27 is a line sensor in which a plurality of pixels for reading images is arrayed in the main-scanning direction. The reading lens 26 focuses the reflected light from the medium S to be read onto a light receiving surface of the CCD 27. The CCD 27 reads an image which is on the reading target line L on the medium S to be read and generates line image data in the main-scanning direction.

The light source 21 irradiates the image which is on the reading target line L on the medium S to be read, i.e. the image to be read, with light. The light source 21 is adjusted so that the irradiation light spreads at a predetermined angle with respect to the optical axis A1. This angle is determined so that the width in the sub-scanning direction of the irradiation light on the medium S to be read becomes a predetermined value. The light source 21 is also adjusted so that the irradiation light spreads in the main-scanning direction and the medium S to be read can be irradiated therewith from one end to the other thereof.

As illustrated in FIG. 4, the overhead image reading apparatus 1 includes a control unit 30 as a brightness controller. The control unit 30 is, for example, an electronic controller including a computer system. The control unit 30 has functions of controlling the light source 21, the image-capturing unit 22 and the drive unit 31 when reading an image. The control unit 30 is connected to the light source 21, the image-capturing unit 22 and the drive unit 31 via an input/output interface unit 33. The control unit 30 can also be connected to an external device 40 such as a personal computer (PC) and an information terminal via the input/output interface unit 33. The overhead image reading apparatus 1 can be controlled by the external device 40 and has a function of reading the medium S to be read and a function of outputting image data of the read medium S to the external device 40 in response to a reading instruction from the external device 40.

The input/output interface unit 33 is connected to a drive circuit of the light source 21. The control unit 30 outputs instructions to the drive circuit via the input/output interface unit 33. The drive circuit controls power supply to the light source 21 on the basis of the instructions from the control unit 30. The control unit 30 controls turning on and off of the light source 21, for example. The control unit 30 also has a function of controlling light emission amount, i.e. brightness, of the light source 21. In the present embodiment, the control unit 30 controls the brightness of the light source 21 by controlling the current duty of current supplied to the light source 21. Specifically, the control unit 30 controls the brightness of the light source 21 through duty control to adjust the ratio of ON time to OFF time of power supply to the light source 21.

When an instruction to turn ON power supply to the light source 21 is provided by the control unit 30, current of a predetermined current value is supplied to the light source 21 by the drive circuit while the ON instruction is provided. When an instruction to turn OFF power supply to the light source 21 is provided by the control unit 30, on the other hand, supply of current to the light source 21 is stopped while the OFF instruction is provided. The control unit 30 can turn on the light source 21 in a pulsed manner by alternately repeating the ON instruction and the OFF instruction of power supply to the light source 21.

When reading of an image is performed by the image-capturing unit 22, the control unit 30 turns on the light source 21 to irradiate the reading target line L with light. The control unit 30 can also drive the image-capturing unit 22 to make the image-capturing unit 22 read the medium S to be read and obtain image data generated by the image-capturing unit 22.

The control unit 30 controls the drive unit 31 to rotate the optical unit 20 about the rotation axis X. The control unit 30 can adjust the position to which the optical unit 20 is rotated about the rotation axis X so that the reading target line L is set to a certain position on the medium S to be read in the sub-scanning direction. Thus, the optical unit 20 can read a line image on the reading target line L set to the certain position on the medium S to be read. The overhead image reading apparatus 1 can obtain image data of the entire medium S to be read by repeating obtaining line image data and adjusting the position of the reading target line L by rotating the optical unit 20. An arrow Y1 indicates a feeding direction that is the direction in which the optical unit 20 is rotated when the overhead image reading apparatus 1 reads the image on the medium S to be read. The overhead image reading apparatus 1 reads line images on the respective lines L to be read while sequentially moving the position of the reading target line L, for example, from a backward position to a forward position in the depth direction to generate two-dimensional image data of the read medium S.

FIG. 1 illustrates the optical unit 20 at a position to which the optical unit 20 is rotated (hereinafter rotational position) to read the image at the backmost area in a readable range. Hereinafter, this rotational position of the optical unit 20 will also be referred to as the "furthest reading position". The optical unit 20 at the furthest reading position can read the side, which is butted against the front end of the pedestal 11, of the medium S to be read. The furthest reading position is a rotational position at which the optical unit 20 starts reading the image.

FIG. 3 is a side view of the overhead image reading apparatus 1 where the optical unit 20 is at a rotational position to read the image at the nearest area in the readable range. Hereinafter, this rotational position of the optical unit 20 will also be referred to as the "nearest reading position". At the nearest reading position, the body 23 of the optical unit 20 is positioned below the shaft 24, in the vertical direction. The optical axis A2 of the image-capturing unit 22 is tilted forward downward in the vertical direction.

The overhead image reading apparatus 1 whose power is turned on stands by in a state in which the optical unit 20 is stored inside the cover 14. When an instruction to start reading is provided, the control unit 30 turns on the light source 21 and rotates the optical unit 20 in the feeding direction Y1 to move to the furthest reading position as illustrated in FIG. 1. When the optical unit 20 reaches the furthest reading position, the optical unit 20 starts reading the medium S to be read. The control unit 30 rotates the optical unit 20 in the feeding direction Y1 while reading the medium S to be read. When the optical unit 20 reaches the nearest reading position and generation of image data at the nearest reading position is finished, the control unit 30 turns off the light source 21. When reading of the image is finished, the control unit 30 rotates the optical unit 20 in the direction opposite to the feeding direction Y1 to store the optical unit 20.

Generally speaking, some users cannot adapt their eye sight to sudden change in brightness when the light source 21 is turned on or off. For example, since it takes time for human eyes to adapt them to a change from a certain bright state to a darker state, or vice versa, the user's eyes cannot follow the change and may sometimes be irritated if switching from the ON state to the OFF state of the light source 21 is sudden, or vice versa.

Figure 5:
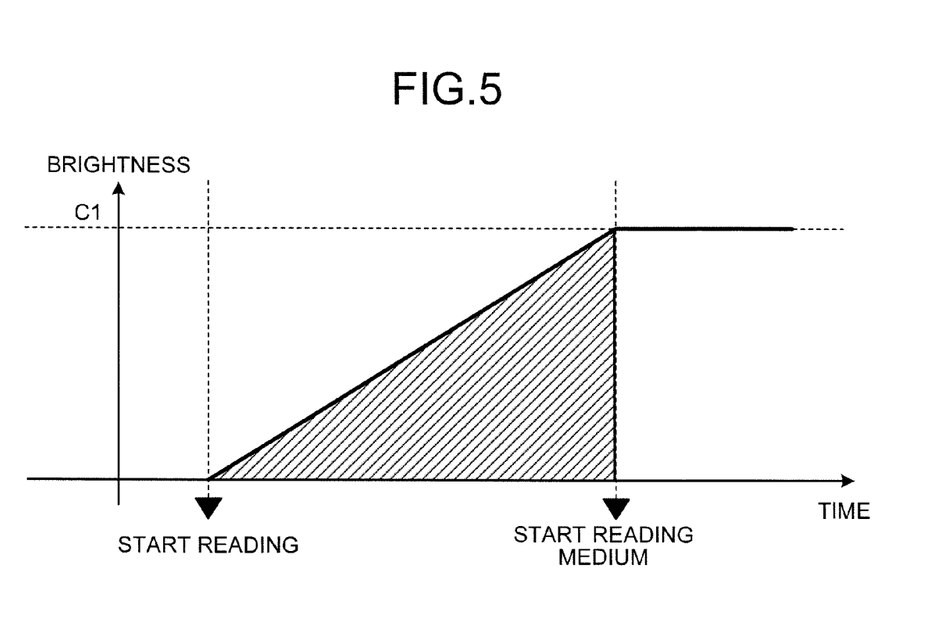
FIG. 5 is a graph illustrating an example of a change in brightness of a light source at the start of reading.

The overhead image reading apparatus 1 according to the present embodiment gradually alters the brightness of the light source 21 both when the light source 21 is turned on and when the light source 21 is turned off. FIG. 5 is a graph illustrating an example of an alteration in brightness of the light source 21 at the start of reading. In FIG. 5, the horizontal axis represents time and the vertical axis represents brightness. When an instruction to start reading is provided by user's operation or the like, the control unit 30 gradually increases brightness, or the brightness of the light source 21. Herein, the control to gradually increase the brightness of the light source 21 when the light source 21 is turned on is referred to as "gradual-brightness-UP control". In the gradual-brightness-UP control according to the present embodiment, the brightness of the light source 21 continuously increases linearly with time elapsed. When the brightness of the light source 21 is increased up to a predetermined brightness C1, the control unit 30 starts reading the medium S to be read. The brightness of the light source 21 is maintained at the predetermined brightness C1 while an image is being read.

Note that "to gradually increase the brightness of the light source 21" means to control the brightness of the light source 21 to be a brightness between a brightness 0 and the predetermined brightness C1 while the brightness of the light source 21 is increased from 0 in the off state to the predetermined brightness C1. In other words, to gradually increase the brightness means to control current supply to the light source 21 so that the brightness increases from 0 to the predetermined brightness C1 via some values of the brightness therebetween instead of bringing the light source 21 to the ON state from the OFF state by just one switching.

Figure 6:
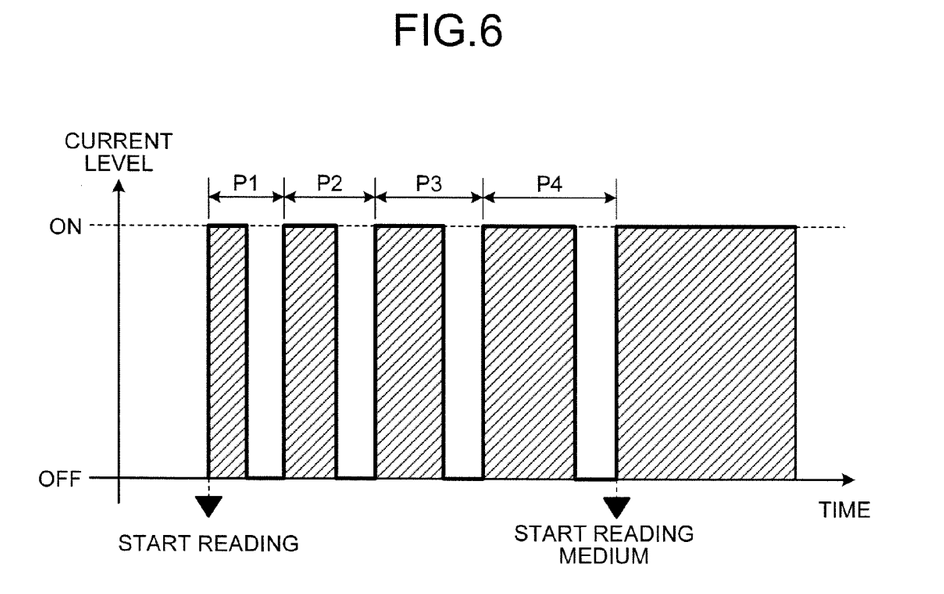
FIG. 6 is a graph explaining duty control on the current.

FIG. 6 is a graph explaining duty control on the current. The control unit 30 gradually alters the brightness of the light source 21 by performing duty control on the current supplied to the light source 21 in the gradual-brightness-UP control. The control unit 30 gradually increases the brightness of the light source 21 by gradually increasing duty ratio. In this embodiment, the duty ratio is defined as a ratio of ON time (area with hatching) to a predetermined period, e.g. P1, P2, P3, and P4, of duty control on the light source 21. The control unit 30 also gradually increases the brightness of the light source 21 by varying the period P1, P2, P3, and P4 of the duty control on the light source 21. In the present embodiment, the control unit 30 increases the period of the duty control, or makes the period longer, with time elapsed from the start of turning on the light source 21 such that relation among P1, P2, P3, and P4 is P1<P2<P3<P4.

In the gradual-brightness-UP control, the light source 21 may be turned on in a pulsed manner at a higher frequency than a response frequency of human eyes. When the light source 21 is turned on in a pulsed manner at a high frequency, it appears to human eyes that the brightness is low. This can reduce a sense of shock given to the user when the light source 21 is turned on.

The duration of time, during which the brightness of the light source 21 is gradually increased when the light source 21 is turned on, preferably has at least a sufficient length for human eyes to be adapted to the change in brightness. In the present embodiment, the duration of time during which the brightness of the light source 21 is gradually increased, that is, the duration of time during which the brightness is increased to the predetermined brightness C1 from the start of turning on the light source 21, is 0.5 seconds. The duration of time during which the brightness of the light source 21 is gradually increased is also referred to as "execution time of gradual-brightness-UP control".

When reading of the image in the readable range is finished, the control unit 30 gradually decreases the brightness of the light source 21 to turn off the light source 21. Contrary to when the light source 21 is turned on, the control unit 30 gradually decreases the brightness of the light source 21 from the predetermined brightness C1 to 0. The control unit 30 gradually decreases the brightness of the light source 21 by gradually decreasing the duty ratio for current control on the light source 21. The control unit 30 also gradually decreases the brightness of the light source 21 by varying the period of the duty control on the light source 21. In the present embodiment, the control unit 30 decreases the period of the duty control, or makes the period shorter, with time elapsed from the start of turning off the light source 21. Herein, the control to gradually decrease the brightness of the light source 21 when the light source 21 is turned off is referred to as "gradual-brightness-DOWN control". In the gradual-brightness-DOWN control according to the present embodiment, the brightness of the light source 21 continuously decreases linearly with time elapsed.

Note that "to gradually decrease the brightness of the light source 21" means to control the brightness of the light source 21 to decrease from the predetermined intensity C1 to the brightness 0 via an intermediate brightness between the predetermined brightness C1 and 0, while the brightness of the light source 21 is decreased from the predetermined intensity C1 to the brightness 0 in the OFF state. In other words, to gradually decrease the brightness means to control current supply to the light source 21 so that the brightness decreases from the predetermined brightness C1 to 0 via some values of the brightness therebetween instead of bringing the light source 21 from the ON state to the OFF state by just one switching.

The duration of time, during which the brightness of the light source 21 is gradually decreased when the light source 21 is turned off, preferably has at least a sufficient length for human eyes to be adapted to the change in brightness. In the present embodiment, the duration of time during which the brightness of the light source 21 is gradually decreased, that is, the duration of time during which the brightness is decreased to 0 from the start of turning off the light source 21 is 0.5 seconds. The time during which the brightness of the light source 21 is gradually decreased is referred to as "execution time of gradual-brightness-DOWN control".

Figure 7:
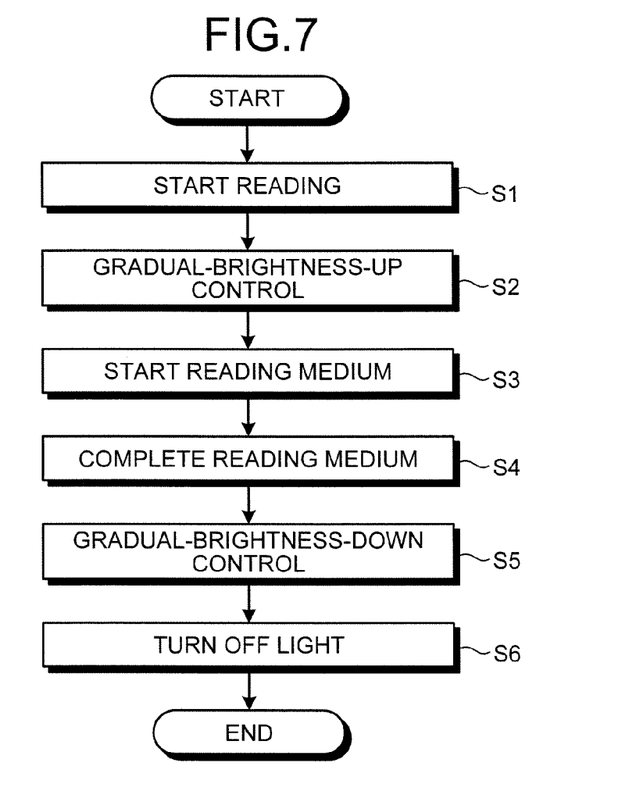
FIG. 7 is a flowchart illustrating a flow of read operation of the overhead image reading apparatus according to the first embodiment.

Next, read control according to the present embodiment will be described with reference to FIG. 7. FIG. 7 is a flowchart illustrating a flow of read operation of the overhead image reading apparatus 1 according to the present embodiment. The control flow illustrated in FIG. 7 is repeated when the overhead image reading apparatus 1 is turned on.

First in step S1, reading is started by the control unit 30. For example, when an input by the user's operation indicating an instruction to start reading such as an input by an operation of, for example, pressing a scan button is detected, the control unit 30 starts a series of reading procedures. After step S1 is performed, the operation proceeds to step S2.

In step S2, the gradual-brightness-UP control is performed by the control unit 30. The control unit 30 gradually increases the brightness of the light source 21 to the predetermined brightness C1 while rotating the optical unit 20 from the storage position at which the optical unit 20 is stored inside the cover 14 toward the furthest reading position. When the brightness of the light source 21 is increased to the predetermined brightness C1, the operation proceeds to step S3.

In step S3, reading of the medium S to be read is started by the control unit 30. The control unit 30 controls the light source 21 to irradiate the reading target line L with light by the light source 21, while rotating the optical unit 20 in the feeding direction Y1, and controls the image-capturing unit 22 to generate line image data of the read line L. When the optical unit 20 moves to the nearest reading position, the operation proceeds to step S4.

In step S4, reading of the medium S to be read is completed by the control unit 30. After step S4 is performed, the operation proceeds to step S5.

In step S5, the gradual-brightness-DOWN control is performed by the control unit 30. The control unit 30 gradually decreases the brightness of the light source 21 in a state in which the optical unit 20 is at the nearest reading position. Note that the gradual-brightness-DOWN control may be performed while the optical unit 20 is rotated in the direction opposite to the feeding direction Y1. In other words, the gradual-brightness-DOWN control may be performed while performing the operation of storing the optical unit 20. When the brightness of the light source 21 is decreased to 0 as a result of the gradual-brightness-DOWN control, the operation proceeds to step S6.

In step S6, the control unit 30 controls the light source 21 to be turned off. The control unit 30 finishes the control on the current supplied to the light source 21 to put the light source 21 into the off state. After step S6 is performed, this control flow is finished.

When turning off of the light source 21 is completed, the control unit 30 rotates the optical unit 20 in the direction opposite to the feeding direction Y1 to store the optical unit 20 inside the cover 14. The overhead image reading apparatus 1 may have a mode in which a plurality of media S to be read is continuously read. For example, when reading of one medium S to be read is completed, the control unit 30 turns off the light source 21 after performing the gradual-brightness-DOWN control and turns the optical unit 20 to the furthest reading position or the storage position to be ready for reading the next medium S to be read. When an instruction to start reading the next medium S to be read is provided, the control unit 30 performs the gradual-brightness-UP control to turn on the light source 21 and starts reading the medium S to be read. The instruction to read the next medium S may be provided by an input by the user's operation or may be provided automatically at certain time intervals by a timer or the like.

As described above, the overhead image reading apparatus 1 according to the present embodiment performs the gradual-brightness-UP control and the gradual-brightness-DOWN control. As a result, it is possible to prevent a sudden change in the brightness when the light source 21 is turned on or turned off, and allow the user's eyes to be adapted to the change in brightness. It is therefore possible to reduce the sense of shock given by light and prevent irritation to the user's eyes.

Second Embodiment

Figure 8:
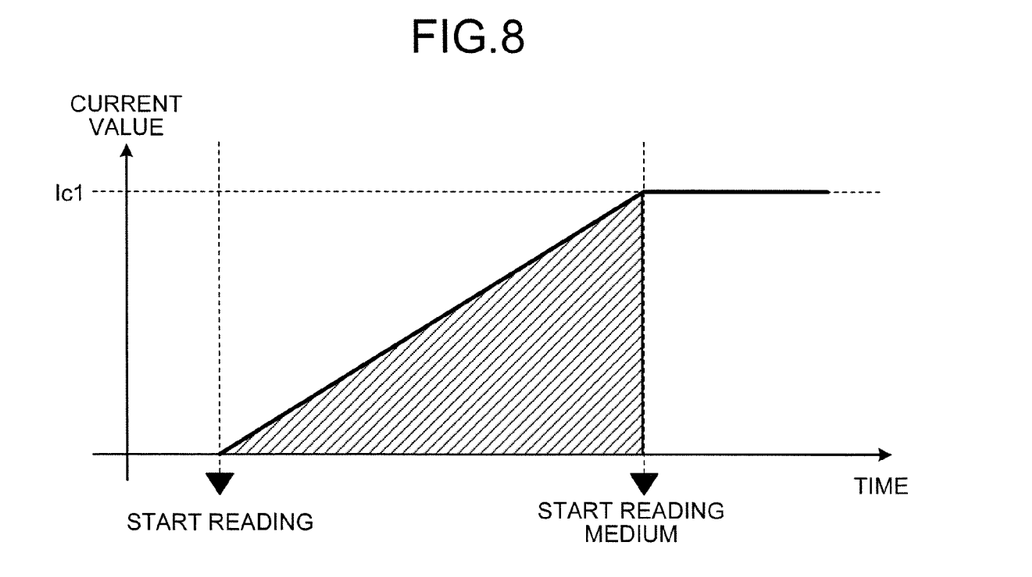
FIG. 8 is a graph for explaining current value control according to a second embodiment.

A second embodiment will be described with reference to FIG. 8. In the second embodiment, components having functions similar to those in the first embodiment described above are designated by the same reference numerals and redundant description thereof are not repeated. FIG. 8 is a graph for explaining current value control according to the second embodiment. In the present embodiment, the difference from the first embodiment described above is to gradually alter the brightness by controlling the current value supplied to the light source 21.

In FIG. 8, the horizontal axis represents time and the vertical axis represents the current value. The control unit 30 increases or decreases the brightness of the light source 21 by respectively increasing or decreasing the current value of current supplied to the light source 21. In the gradual-brightness-UP control, the control unit 30 gradually increases the current value of the current supplied to the light source 21 to a predetermined current value Ic1 at which the brightness of the light source 21 becomes the predetermined brightness of C1. In the present embodiment, the control unit 30 continuously increases the current value linearly with time elapsed from the start of turning on the light source 21.

In the gradual-brightness-DOWN control, the control unit 30 gradually decreases the current value of the current supplied to the light source 21 from the predetermined current value Ic1. In the present embodiment, the control unit 30 continuously decreases the current value linearly with time elapsed from the start of turning off the light source 21.

Third Embodiment

Figure 9:
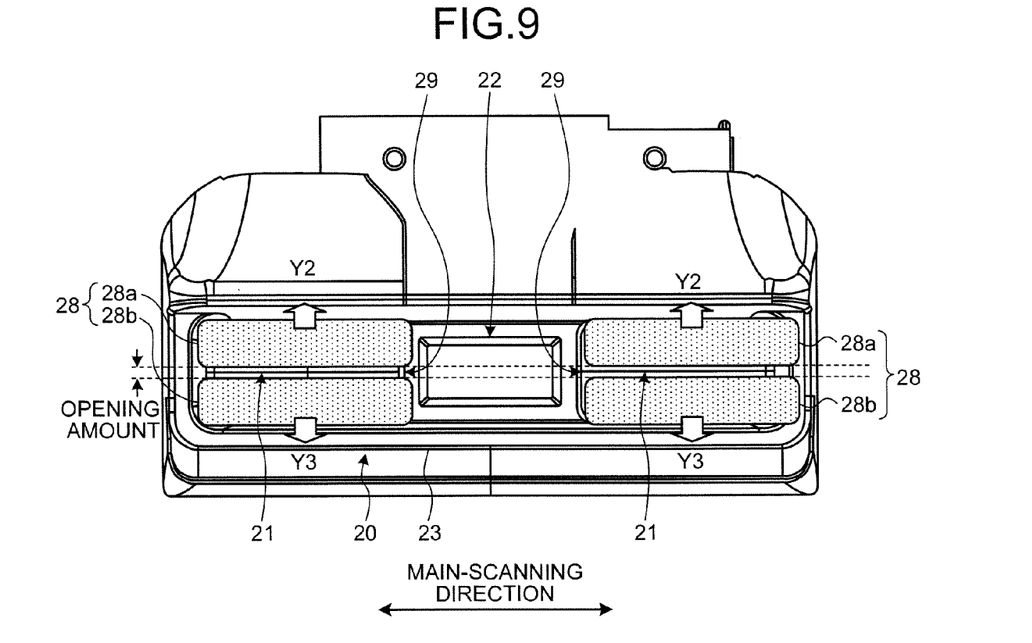
FIG. 9 is a view illustrating a fully-closed state of a brightness adjusting mechanism of an optical unit according to a third embodiment.
Figure 10:
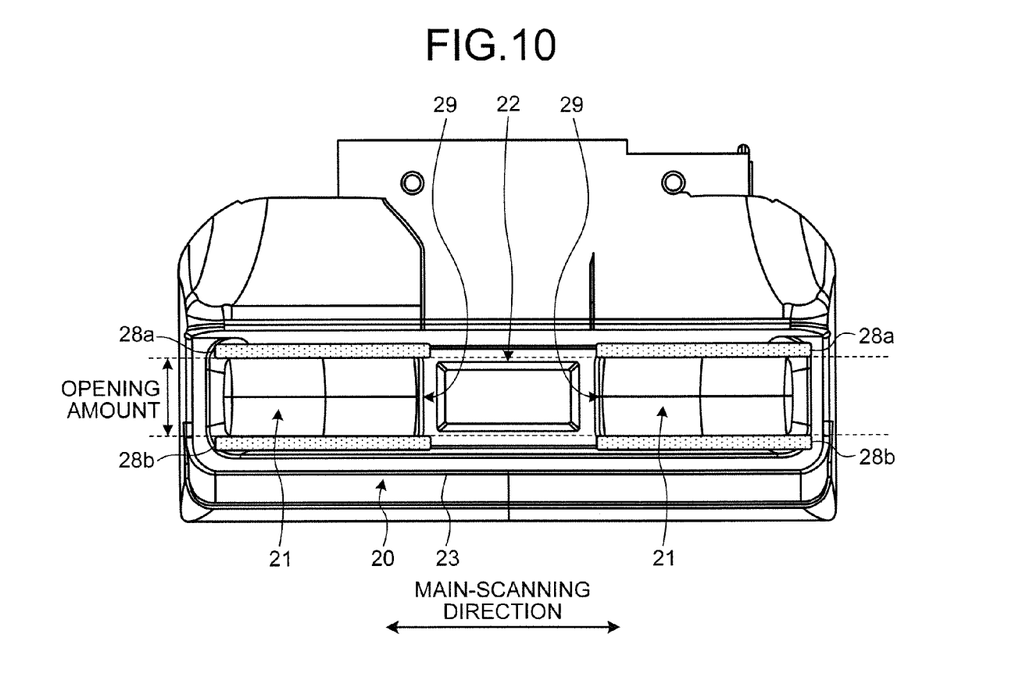
FIG. 10 is a view illustrating a fully-open state of the brightness adjusting mechanism.

A third embodiment will be described with reference to FIGS. 9 and 10. In the third embodiment, components having functions similar to those in the first embodiment described above are designated by the same reference numerals and redundant description thereof are not repeated. In the third embodiment, the brightness controller is a brightness adjusting mechanism 28 which controls the brightness mechanically and the control unit 30. FIG. 9 is a view illustrating a totally-closed state of the brightness adjusting mechanism 28 of an optical unit according to the third embodiment. FIG. 10 is a view illustrating a fully-open state of the brightness adjusting mechanism 28. In the present embodiment, the difference from the embodiments described above is that the brightness controller includes the brightness adjusting mechanism 28 having an aperture with a variable opening area between the light source 21 and the placement surface 2, and that the brightness controlling mechanism 28 alters the brightness by controlling the opening amount, i.e. opening width, of the aperture instead of altering the brightness of the light source 21.

FIGS. 9 and 10 illustrate plan views of the optical unit 20 as viewed in the direction of the optical axis A1 of the light sources 21. In the optical unit 20, two light sources 21 are arranged with the image-capturing unit 22 therebetween. One light source 21 is arranged on one side in the main-scanning direction of the optical unit 20 while the other light source 21 is arranged on the other side in the main-scanning direction of the optical unit 20.

The optical unit 20 includes brightness adjusting mechanisms 28. The brightness adjusting mechanisms 28 are provided for the respective light sources 21. The brightness adjusting mechanisms 28 are automatically opened when the light sources 21 are turned on and automatically closed when the light sources 21 are turned off. The brightness adjusting mechanisms 28 each have two flaps 28a and 28b having light shielding properties. The flaps 28a and 28b are rectangular flat members that are positioned on the side of the placement surface 2 with respect to the light sources 21. The flaps 28a and 28b are aligned so that the longitudinal direction thereof is parallel to the main-scanning direction and that one side of the flap 28a and one side of the flap 28b in the longitudinal direction are opposed to each other in the totally-closed state.

The flaps 28a and 28b are rotatably supported by the body 23 of the optical unit 20. Specifically, the flap 28a has a rotary shaft on the side opposite to that facing the flap 28b and is rotatable about the rotary shaft. The flap 28b has a rotary shaft on the side opposite to that facing the flap 28a and is rotatable about the rotary shaft. The optical unit 20 has a drive unit, such as a motor, that drives the flaps 28a and 28b to rotate and rotates the flaps 28a and 28b to any positions between totally-closed positions and fully-open positions.

An aperture 29 is formed between the flaps 28a and 28b. FIG. 9 illustrates the brightness adjusting mechanisms 28 in the totally-closed state in which the flaps 28a and 28b are at the totally-closed positions. When the brightness adjusting mechanisms 28 are in the totally-closed state, the opening area of the apertures 29, that is determined by the width of the gaps between the flaps 28a and 28b is minimum. In this case, the brightness of light emitted by the light sources 21 toward the placement surface 2 becomes minimum. When the flaps 28a and 28b are rotated in the directions of arrows Y2 and Y3 illustrated in FIG. 9, the opening area of the apertures 29 increases.

FIG. 10 illustrates the brightness adjusting mechanisms 28 in the fully-open state in which the flaps 28a and 28b are at the fully-open positions. When the brightness adjusting mechanisms 28 are in the fully-open state, the opening area of the apertures 29 is maximum. In this case, the brightness of light emitted by the light sources 21 toward the placement surface 2 becomes maximum. The fully-open positions of the flaps 28a and 28b are positions, for example, at which light emitted by the light sources 21 toward the placement surface 2 is not shielded.

The control unit 30 controls the positions to which the flaps 28a and 28b are rotated. In the gradual-brightness-UP control, the control unit 30 first turns on the light sources 21 in a state in which the flaps 28a and 28b are at the totally-closed positions. The brightness of the light sources 21 at this point is the predetermined brightness C1 and is maintained until the gradual-brightness-UP control is completed. After turning on the light sources 21, the control unit 30 gradually rotates the flaps 28a and 28b from the totally-closed positions toward the fully-open positions. For example, the control unit 30 controls rotation angles of the flaps 28a and 28b so that the brightness of light emitted through the apertures 29 continuously increases linearly with time elapsed, for example. After rotating the flaps 28a and 28b to the fully-open positions, the control unit 30 finishes the gradual-brightness-UP control and starts reading the medium S to be read.

In the gradual-brightness-DOWN control, the control unit 30 rotates the flaps 28a and 28b from the fully-open positions to the totally-closed positions while maintaining the brightness of the light sources 21 at the predetermined brightness C1. For example, the control unit 30 controls the rotation angles of the flaps 28a and 28b so that the brightness of light emitted through the apertures 29 continuously decreases linearly with time elapsed. After turning the flaps 28a and 28b to the totally-closed positions, the control unit 30 finishes the gradual-brightness-DOWN control and turns off the light sources 21.

In the present embodiment, the brightness adjusting mechanisms 28 adjust the opening area of the apertures 29 by rotating the flaps 28a and 28b, but the mechanism for adjusting the opening area of the apertures 29 is not limited thereto. For example, the brightness adjusting mechanisms 28 may adjust the opening area of the apertures by sliding shielding members relative to the light sources 21.

Modified Examples of Embodiments

While both of the gradual-brightness-UP control and the gradual-brightness-DOWN control are performed by the control unit 30, either one of the gradual-brightness-UP control and the gradual-brightness-DOWN control may be performed instead. That is, control for gradually altering the brightness of the light source 21 may be performed at least one of when the light source 21 is turned on and when the light source 21 is turned off.

The execution times of the gradual-brightness-UP control and the gradual-brightness-DOWN control are not limited to those in the embodiments described above. The execution times can be defined as necessary in a range of 0.1 second or longer, for example.

In the embodiments described above, the brightness of the light source 21 is increased linearly with time elapsed, but the manner in which the brightness is increased is not limited thereto. The brightness of the light source 21 may be increased non-linearly or non-continuously. For example, the brightness of the light source 21 may be increased in a stepwise manner. In addition, control for increasing the brightness of the light source 21 in a logarithmic manner or control for increasing the brightness in an exponentially manner may be performed. Similarly for the gradual-brightness-DOWN control, the brightness of the light source 21 may be reduced non-linearly or non-continuously. For example, the brightness of the light source 21 may be decreased in a stepwise manner. In addition, control for decreasing the brightness of the light source 21 in a logarithmic manner or control for decreasing the brightness in an exponentially manner may be performed.

The execution time of the gradual-brightness-UP control and that of the gradual-brightness-DOWN control may be different. The time taken for dark adaptation that is adaptation to a decrease in the brightness is longer than the time taken for light adaptation that is adaptation to an increase in the brightness. For example, the execution time of the gradual-brightness-DOWN control may be set to be longer than that of the gradual-brightness-UP control.

The brightness of the light source 21 is gradually increased from 0 to the predetermined brightness C1 in the gradual-brightness-UP control in the embodiments described above, but instead, the brightness of the light source 21 may be gradually increased up to a certain brightness and then increased straight to the predetermined brightness C1. Alternatively, the brightness of the light source 21 may be increased from 0 straight to a certain brightness and then gradually increased to the predetermined brightness C1.

The brightness of the light source 21 is gradually decreased from the predetermined brightness C1 to 0 in the gradual-brightness-DOWN control in the embodiments described above, but instead, the brightness of the light source 21 may be gradually decreased to a certain brightness and then decreased straight to 0. Alternatively, the brightness of the light source 21 may be decreased from the predetermined brightness C1 straight to a certain brightness and then gradually decreased to the brightness 0.

The execution time of the gradual-brightness-UP control and that of the gradual-brightness-DOWN control may be varied according to the surrounding environment. For example, the execution times may be varied according to the brightness around the overhead image reading apparatus 1, that is, the ambient light. When the ambient light is bright, the execution time of the gradual-brightness-UP control may be set to be shorter than when the ambient light is darker. When the ambient light is bright, the execution time of the gradual-brightness-DOWN control may be set to be shorter than when the ambient light is darker.

The light source 21 includes LEDs in the embodiments described above, but instead, other light sources such as fluorescent light and incandescent light bulbs may be used. The adjustment of the brightness may be performed as necessary according to the type of the light source, and the brightness of the light source 21 may be increased or decreased by changing the supply voltage, for example.

Reading of an image is started from the furthest reading position in the embodiments described, but conversely, reading of an image may be started from the nearest reading position.

The disclosure in the embodiments and modified examples can be performed in combination as necessary.

With the overhead image reading apparatus according to the present invention, the brightness of the light source is gradually altered at least either when the light source is turned on or when the light source is turned off. With the overhead image reading apparatus according to the present invention, an advantageous effect that the irritation to users' eyes can be prevented can be produced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An overhead image reading apparatus comprising:
   an optical unit arranged to be rotatable around a rotation axis extending horizontally in a main scanning direction, the optical unit including:

an image-capturing unit including a line sensor configured to capture an image of a medium to be read placed on a placement surface from above, and
a light source configured to irradiate the medium with a slit-light beam during capturing the image by the image-capturing unit, wherein
an optical axis of the light source emitting the slit-light beam and an optical axis of the image capturing unit overlap each other when viewed in an axial direction of the rotation axis;
a drive unit including a drive source to control a rotation angle of the optical unit;
an interface configured to receive an instruction to start reading; and
a brightness controller to control the light source, the image-capturing unit and the drive unit, the brightness controller configured to
maintain brightness of the light source at predetermined brightness while controlling the image-capturing unit to capture the image of the medium, and
gradually alter the brightness of the light source at least in one of cases where the light source is turned on, after receiving the instruction to start reading, the brightness controller gradually increases the brightness of the light source from zero to the predetermined brightness, and where the light source is turned off, after the image-capturing unit finishes capturing the image of the medium, the brightness controller gradually decreases the brightness of the light source from the predetermined brightness to zero, wherein
the brightness controller controls the light source and the drive unit so that the brightness controller controls the light source to gradually increase the brightness of the light source from zero to the predetermined brightness while controlling the drive unit to rotate the optical unit from a storage position at which the optical unit is stored inside a cover toward a furthest reading position at which the optical unit reads an image at a backmost area in a readable range, after receiving the instruction to start reading,
the brightness controller controls the light source to gradually decrease the brightness of the light source from the predetermined brightness to zero at a nearest reading position at which the optical unit reads an image at a nearest area in the readable range, or while controlling the drive unit to perform an operation of storing the optical unit, after reading of medium is completed, and
the brightness controller controls change rates of brightness of the light source according to ambient light so that the change rate of brightness of the light source when the ambient light is bright, becomes greater than the change rate of brightness of the light source when the ambient light is dark.

2. The overhead image reading apparatus according to claim 1, wherein the brightness controller includes a duty controlling unit that performs duty control on current supplied to the light source to gradually alter the brightness.

3. The overhead image reading apparatus according to claim 1, wherein the brightness controller includes a current control unit that controls a current value supplied to the light source to gradually alter the brightness.

4. The overhead image reading apparatus according to claim 1, wherein the brightness controller includes a variable aperture between the light source and the placement surface to gradually alter the brightness by controlling an opening area of the aperture.

5. The overhead image reading apparatus according to claim 1, wherein the light source includes a light emitting diode (LED).

* * * * *